United States Patent Office 3,029,190
Patented Apr. 10, 1962

3,029,190
SELECTION OF NEUROTROPIC VIRAL STRAINS AND PREPARATION OF VACCINES THEREFROM
Robert Paul Hanson, 5730 Dogwood Place, Madison, Wis., and Frank F. Piraino, 1211 W. Missin Ave., Ashland, Ohio
No Drawing. Filed Aug. 4, 1959, Ser. No. 831,458
5 Claims. (Cl. 167—78)

This invention relates to new processes of selecting strains of neurotropic viruses and utilizing these new techniques in the preparation of vaccines.

A number of vaccines which comprise live attenuated viruses have been prepared and are being used in immunizing against viral diseases. These live viral vaccines have the capacity to elicit the production of protective antibodies without, however, causing serious illness. Although strains of several different pathogenic viral agents which are attenuated to this degree have been isolated, the isolation procedure and development of a vaccine therefrom is not easy. Some naturally occurring or spontaneously induced avirulent viruses which can be effectively employed in vaccines have been recovered from natural sources. This, however, is usually a fortuitous incident.

Attenuated strains of pathogenic viral agents which can be made into safe, live viral vaccines have been developed in the laboratory. For instance, the Rinderpest virus has been adapted to grow in an unnatural host, such as goats or rabbits, and after continued serial passage in such animals, it has become attenuated so that it no longer causes the disease when injected into its natural host. Similarly, strains of hog cholera virus have been adapted to grow in rabbits and thereafter upon continued serial passage in rabbits attenuated to an avirulent form for swine. The development of non-virulent viral strains by these techniques is an empirical and unpredictable process. Many viral agents will not propagate in species of animals other than their own natural host. Even after a strain of virus has been adapted to grow in an unnatural host, there is no assurance that it will attenuate to a non-virulent state. Presently, known methods of isolating non-virulent strains of pathogenic viruses are, therefore, extremely difficult, time-consuming, expensive and uncertain.

The present invention provides means of quickly selecting strains of neurotropic viruses of lowered pathogenicity which can be made into safe and effective live viral vaccines. The term "neurotropic virus" as used herein refers to those viruses which have a natural affinity for nervous tissue. In other words, they propagate best on nerve cells.

It is believed that when a neurotropic virus attacks an animal host, the virus is first adsorbed on a receptor substance which is contained in or on the membrane which covers the nerve cell. Adsorption is normally followed by penetration, multiplication and finally release of the virus progeny. If the virus cannot adsorb upon the surface of susceptible cells, the infection cycle is broken and the cell is resistant to attack.

The present invention is based in part upon the assumption that within a random or normal neurotropic virus population, there are some virus particles which do not readily adsorb upon the surface of nerve cells. Since this non-adsorbing fraction of the viral population is relatively small, it is difficult to isolate except perhaps by chance. It does not attack the nerve tissue as readily as other particles of the viral population and the non-adsorbable fraction seldom, if ever, gains ascendency in the population and consequently remains a minor element.

The present invention provides a means of taking advantage of the above described situation whereby those viral bodies which attacked nervous tissue only weakly can be separated from those that are strongly adsorbed. Despite the fact that these weakly adsorbable particles do not have a strong affinity for nervous tissue, they nevertheless will propagate in the animal host and by reaction with lymphocytes or mast cells give rise to the production of protective antibodies. Such viral particles can, therefore, be made into effective live viral vaccines.

Generally speaking, the invention is practiced by contacting neurotropic viral bodies with cells of nervous tissue and separating and recovering the viral material that is not adsorbed. When this process is repeated a sufficient number of times with the non-adsorbed viral material the more neuotropic or virulent virus elements of the viral preparation are all adsorbed on the nerve cells and are thus separated from the non-virulent bodies. These viruses can be recovered, grown in suitable culture media and made into an effective vaccine.

The selection of an avirulent strain of a neurotropic virus in accordance with the present invention and the production of a vaccine therefrom can be illustrated by the following in which virulent Newcastle disease virus was developed into a non-virulent viral preparation which was effective in immunizing chickens against pathogenic Newcastle disease virus.

A Newcastle disease strain of moderate virulence for chickens, Iowa–125, was employed. This strain has a $10^{-2} LD_{50}$ titer for eight week old chickens when inoculated by the intravenous route and a $10^{-9} LD_{50}$ titer in ten day old chicken embryos. Chicken embryos were supplied by a commercial hatchery whose flocks during this period were free from infectious disease. Incubation prior to inoculation was at 38° C., humidity was sixty percent, and the eggs were turned every two hours. Day old chicks for determining the intracerebral pathogenicity index (ICPI) were used. Like the older chickens used for evaluating virulence obtained from the same source, they were of cross-bred New Hampshire-Leghorn stock. All birds were maintained in adequate isolation facilities. The brain-cell suspensions were prepared as follows:

Brains from 100 ten day old embryos, removed by squeezing the head firmly between the fingers, were allowed to drop into sterile petri dishes. Brains were then placed into 250 ml. screw cap prescription bottles containing about 150 ml. of physiological saline, pH 7.0±.3 units, and shaken in a vigorous up and down movement until the membranes were seen to come loose and float to the surface. The saline wash and membranes were then discarded. This was repeated five to seven times in fresh saline until the washings became clear. The brains then appear completely white, free of blood and membranes. After the last washing, 20 ml. of saline was allowed to bathe them, and the contents vigorously macerated with a 2 ml. capacity automatic pipette which was pumped at least fifty times. The macerated suspension was then poured into 50 ml. plastic centrifuge tubes and washed three times in physiological saline (0.85 percent), by centrifugation at 5000 r.p.m. in a Sorvall type centrifuge at 4° C., for fifteen minutes. After each centrifugation the cells were resuspended in saline with an automatic pipette to free the brain suspension of any trapped red blood cells. After the last centrifugation the cells were packed for thirty minutes at 5000 r.p.m. The tubes then contained three distinct cell layers. A red button at the bottom contained only red blood cells, a pink layer above this contained both red blood cells and microglia cells and a top white layer free of red blood cells contained microglial cells and brain cell fragments. Only the white layer at the surface was used for adsorption experiments. This was collected by carefully pouring or pipetting of this layer, discarding the remaining contents in the tube. The brain suspension was then packed by centrifugation for fifteen minutes as previously described, and stored in the cold (4° C.), by adding penicillin and streptomycin at levels of 1000 units and 1 mg. per ml. of packed cells respectively. Desired cell concentrations were prepared by measuring a specific volume in a graduated pipette, and making the appropriate dilutions in physiological saline. Cells were never used longer than one day after storage.

Culture of the virus in embryos for titration and for reestablishment of the virus population to be subjected to the adsorption cycle was by the allantoic route of inoculation in ten day old embryos. The adsorption procedure utilized the brain-cell suspension. Undiluted virus of the Iowa–125 strain as contained in allantoic-amniotic fluids was added in a 0.5 ml. amount to 2 ml. of a ten percent brain-cell suspension. Adsorption was allowed to proceed on a Eberbach shaking machine set at maximum capacity at 4° C. for fifteen minutes. Unadsorbed virus was then harvested after centrifugation at 5000 r.p.m. for fifteen minutes by pipetting off the supernatant fluid. This was then reexposed to a fresh brain-cell suspension as it was in the initial exposure. The adsorption process was repeated a total of five times.

After the fifth exposure to washed brain cells the unadsorbed virus remaining in the supernatant was inoculated into ten day old chicken embryos at various dilutions. Approximately 80 embryos were inoculated in the allantoic chamber with the unadsorbed virus at $10^{-5}$ to $10^{-10}$ dilutions. Virus containing allantoic-amniotic fluid collected from each of the embryos dying at the $LD_{50}$ dilution was designated as Iowa 125–1. The number following I–125 in the table below indicates the number of times virus was exposed to an adsorption series. The harvested virus was then scored for neuropathogenicity by inoculation of 0.05 ml. of a $10^{-1}$ dilution, intracerebrally into 10 one day chicks. On the basis of the response of these chicks, the intracerebral pathogenic index (ICPI) was calculated (Hanson and Brandly, 1955, Identification of Vaccine Strains of Newcastle Disease Virus, Science 122: 156–157). Those fluids having the lowest ICP index were then selected for readsorption upon fresh brain cell preparations. This passage was labeled Iowa–125–2. The entire process, adsorption on brain cells, isolation of a virus line or lines at the $LD_{50}$ dose and calculation of the ICP index was done five times. Pathogenicity of the Newcastle disease strain Iowa–125 for ten day old chicken embryos was determined by calculating the average death time of the minimal lethal dose (Hanson and Brandly, 1955 supra).

The ICP index and the average death time at the minimal lethal dose of the derived lines of Iowa–125 are shown in Table I.

TABLE I

*Decreased Pathogenicity of Derived Lines of Iowa–125 as Measured by Increase in Embryo Death Time and Decrease in Intracerebral Pathogenicity for Day Old Chicks*

| Line | Average Death Time of M.L.D. in Hours | Intracerebral Pathogenicity Index |
| --- | --- | --- |
| I–125–0 | 46 | 1.8 |
| I–125–1 |   | 1.7, 1.7, 1.7, 1.7, 1.7, 1.7, 1.6 * |
| I–125–2 |   | 1.3, 1.2 *, 1.3, 1.3, 1.3, 1.4, 1.3, 1.2 *, 1.3, 1.3 |
| I–125–3 | 57 | 1.3, 1.5, 1.1 *, 1.2, 1.5, 1.4, 1.2 |
| I–125–4 | 81 | .45 *, .83, .2, 1.1 |
| I–125–5 | 78 | .31, .57, .59, 1.3, .6, .54 |

*Cultures used for repassage.

The results of experiments to determine the pathogenicity of the parental and derived lines of Iowa–125 are presented in Table II. Allantoic-amniotic fluid from incubated eggs inoculated with the virus Iowa–125 and Iowa–125–5 was diluted with tryptone broth in ten fold dilutions and 0.5 ml. of each dilution was injected into the breast muscle of five week old chickens. Four chickens were used per dilution. The number of dead, paralyzed or normal chickens was recorded.

TABLE II

*Titration of the Parent and Derived Line of Iowa–125 in Five Week Old Chickens*

(Four chickens received each dilution in the heart muscle)

| Dilution Neg. Log Base 10 | Parent Strain Iowa–125–0 | Derived Strain Iowa–125–5 |
| --- | --- | --- |
| 1 | 1–3–0 | 0–0–4 |
| 2 | 1–3–0 | 0–0–4 |
| 3 | 2–2–0 | 0–0–4 |
| 4 | 0–4–0 | 0–0–4 |
| 5 | 1–3–0 | 0–0–4 |
| 6 | 0–2–2 | 0–0–4 |
| 7 | 0–2–2 | 0–0–4 |
| Dead | 5 . . | 0 . . |
| Paralyzed | . 19 . | . 0 . |
| Normal | . . 4 | . . 28 |

It is evident from the results that the derived line, at all seven dilutions, Iowa–125, was innocuous for five week old chickens. The parental stock, Iowa–125–0 was both neurotropic and lethal for the chickens. Control chickens inoculated with 0.5 ml. of tryptone broth remained normal throughout.

Chickens inoculated with line Iowa–125–5 were challenged fourteen days later with 0.5 ml. of a $10^{-2}$ dilution of highly neurotropic Newcastle strain, Texas GB, inoculated in the breast muscle. Control chickens which were unvaccinated received the same dose. The results are presented in Table III.

TABLE III

*Immune Response of Chickens Which Had Received Iowa–125 When Challenged by Intramuscular Inoculation With Texas GB*

| Dilution of Immunization Dose Neg. Log Base 10 | Dead/Alive at Fourteen Days |
| --- | --- |
| 1 | 0/4 |
| 2 | 0/4 |
| 3 | 0/4 |
| 4 | 0/4 |
| 5 | 0/4 |
| 6 | 0/4 |
| 7 | 0/4 |
| No Vaccinated Controls | *6/0 |

*Death occurred three at three days, two at four days, and one at five days.

All of the unvaccinated control birds died within six days—three of them dying as early as the third day. Birds that had been previously inoculated with virus line Iowa–125–5 remained normal throughout the observation period. It appears that the derived line multiplied within the tissues of the inoculated chickens and induced antibody production without causing clinical disease.

The vaccine described above to immunize chickens against Newcastle disease was prepared from a virus preparation which had been subjected to adsorption on nerve cell tissue twenty-five times. It will be understood, of course, that when the starting viral material is of low pathogenicity, as happens in some naturally occurring strains of Newcastle disease virus, the number of adsorption treatments may be smaller. For instance, ten adsorptions might very well yield a viral product which may be safely injected into chickens without causing serious illness. It may be noted in this connection that it is not always necessary to develop the viral strain in accordance with the process described herein to a state at which it will give no reaction when injected. In the case of many vaccines, the subject often reacts to the immunization in some visible manner, frequently by a slight febrile response. Such vaccines, however, if properly attenuated, do not cause frank illness or endanger the life of the subject, and may be more useful than those which give no visible response.

Some viral agents which are highly virulent may require more than twenty-five adsorption treatments to make them completely safe. One hundred individual adsorption treatments might be considered desirable when working with highly virulent viruses such as the rabies virus. The exact number of passages that are advisable can be readily determined for any particular neurotropic virus by a skilled virologist using standardized procedures for determining virulence.

The time of contact between the neurotropic virus and the nerve cells to assure adsorption of the more highly neurotropic viral particles is not particularly critical. Fifteen minutes of contact was found to be adequate in the case of the Newcastle disease virus preparations described above. In general, adequate adsorption of the more highly neurotropic viruses may be obtained within five minutes, whereas longer periods of time, in excess of one hour, may be desirable with other viral preparations which have a lower affinity for nerve cell tissue.

Although the invention was illustrated by means of the Newcastle disease virus, which is a commonly encountered neurotropic virus affecting poultry, it is to be understood that vaccines of other neurotropic viral agents having low pathogenicity may be obtained by the same process. Ordinarily, the viral agent will be adsorbed on nerve tissue of the host with which the virus is most generally associated. In the above example, Newcastle disease virus was adsorbed on the nerve cells of chickens, since this virus is usually associated with chickens. Similarly, when selecting a strain of poliomyelitis virus of reduced pathogenicity, the viral preparation would be exposed to nervous tissue of primates in order to adsorb and remove the more neurotropic viral particles.

When developing a rabies vaccine, the virulent viral material employed to start the process would ordinarily be adsorbed on central nervous tissue of dogs, foxes or other animals of the canine family. Inasmuch as the rabies virus, as distinguished from some other neurotropic virus, attacks a wide variety of mammals, nervous tissue from various mammalian sources may also be used if desired. The same considerations apply when developing avirulent strains of other neuro viruses such as those of Easter and Western Encephalomyelitis, St. Louis Encephalitis, Avian Encephalomyelitis, Canine distemper, Japanese B. Encephalitis, louping ill, and other viral agents which are known to attack nervous tissue.

The production of vaccine from the selected non-virulent viral material follows procedures commonly employed in the art. The viral agent, if it be one which will propagate in chick embryos, may be inoculated into chick embryos of five to nine days of age and the incubation continued for another two to twelve days after which all or part of the extra embryonic membranes and fluids and embryos are harvested and ground into a suspension which constitutes the vaccine. If desired, only certain portions of the infected chick embryo may be harvested, such as the amniotic fluid or the allantoic fluid. If the viral agent is one that will not propagate in chick embryos, it may be inoculated into an animal host to which it has a natural affinity and after a suitable period of development in the host, the animal is sacrificed and a vaccine is prepared from the brain, spleen, kidney, heart, blood, or other tissue in which the virus population is found to be most concentrated. Also, the vaccine may be made by tissue culture methods which are well known in the art. For instance, the poliomyelitis virus preparation which has been selected for non-virulence by the adsorption process described herein may be inoculated into a tissue culture and after a period of multiplication therein the liquid is removed and a vaccine produced therefrom as is the polio vaccine of the present day. It will be understood, of course, that because of the non-virulent nature of the viral agent used to inoculate the tissue culture, inactivation by treatment of formaldehyde or other substances is unnecessary. The live viral preparation itself may be used as an inoculating agent either by the intramuscular or oral route, or other routes.

We claim:

1. A method of obtaining strains of neutrotropic viruses of low virulence which comprises the steps of preparing an aqueous suspension of normal nerve cell tissue and adding thereto neurotropic viral particles of varying degrees of virulence, the said viral particles having a neurotropic affinity for the nerve cell tissue in said suspension, agitating the mixture and allowing the viral particles to come in contact with said nerve cell tissue for a period of time ranging from about 5 minutes to 1 hour whereby the viral particles having a strong affinity for the nerve cell tissue are adsorbed thereon, removing nerve cell tissue with adsorbed viral particles from the aqueous suspension and recovering the non-adsorbed viral particles therein, contacting again the unadsorbed viral particles with normal cells and repeating the process of adsorption and recovery of non-adsorbed viral particles at least five times and recovering the non-adsorbed viral particles having little affinity for the normal nerve cell tissue.

2. A method of obtaining strains of neurotropic viruses of low virulence which comprises the steps of preparing an aqueous suspension of normal nerve cell tissue and adding thereto neurotropic viral particles, the said viral particles having an affinity for the nerve cell tissue in said suspension in varying degrees, agitating the mixture and allowing the viral particles to come in contact with said nerve cell tissue for a period of time ranging from about 5 minutes to 1 hour whereby the viral particles having a strong affinity for the nerve cell tissue are adsorbed thereon, removing nerve cell tissue with adsorbed viral particles from the aqueous suspension and recovering the non-adsorbed viral particles therein, contacting again the unadsorbed viral particles with normal nerve cell tissue and repeating the process of adsorption and recovery of non-adsorbed viral particles at least five times, inoculating a culture medium containing tissue on which the virus will grow with the non-adsorbed viral particles and culturing the virus therein to reestablish the viral population and thereafter preparing an aqueous suspension of normal nerve cell tissue and contacting the cultured viral particles with said nerve cell tissue and repeating the process of adsorption upon normal nerve cell tissue and recovery of unadsorbed virus until viral particles of a desired degree of virulence have been obtained.

3. A method of obtaining neurotropic viral particles of low virulence from a viral population comprising neurotropic viral particles of varying degree of virulence which comprise the steps of obtaining normal nerve cell tissue free from cellular debris and preparing an aqueous suspension thereof, adding to said aqueous suspension neurotropic viral particles having a varying degree of affinity for the nerve cell tissue in said suspension, agitating the mixture and allowing the viral particles to come in contact with said nerve cell tissue for a period of time ranging from about 5 minutes to 1 hour whereby the viral particles having a strong affinity for the nerve cell tissue are adsorbed thereon, removing nerve cell tissue with adsorbed viral particles from the aqueous suspension, preparing a second aqueous suspension of normal nerve cell tissue and agitating it with viral particles unadsorbed on the first contact with normal nerve cell tissue and continuing the process of recovering the non-adsorbed viral particles and contacting them again with normal nerve cell tissue for at least five times, reestablishing the viral population by inoculating a tissue containing substrate in which the non-adsorbed viral particles will propagate, and after the viral population has been reestablished, again subjecting it to repeated contacts with normal nerve cell tissue and recovering non-adsorbed viral particles of lower virulence than the starting virus.

4. A method of obtaining strains of Newcastle disease virus of low virulence which comprises the steps of preparing an aqueous suspension of normal chick embryo nerve cell tissue free from cellular debris and contacting said nerve cell tissue for a period of from about 5 minutes to 1 hour with virulent Newcastle disease virus whereby the more highly neurotropic viral particles are adsorbed upon the chick embryo nerve cell tissue, separating said nerve cell tissue from the aqueous suspension and again preparing an aqueous suspension of normal chick embryo nerve cell tissue and contacting it with the non-adsorbed Newcastle disease virus particles and repeating the steps of contacting the non-adsorbed viral particles with normal chick embryo nerve cell tissue and separation therefrom of non-adsorbed virus particles for at least five times and recovering the solution containing Newcastle disease virus of a lower degree of virulence than in the starting viral preparation.

5. A method of preparing a vaccine effective in immunizing chickens against infection by virulent Newcastle disease virus which comprises the steps of preparing an aqueous suspension of normal chick embryo nerve cells free of cellular debris and contacting said nervous tissue with Newcastle disease virus for a period of from about 5 minutes to 1 hour whereby the more neurotropic Newcastle disease virus particles are adsorbed on the chick embryo nerve cells, separating the nerve cell tissue from the aqueous suspension and recovering the unadsorbed Newcastle disease virus particles, repeating the process of contacting the non-adsorbed Newcastle disease virus with normal chick embryo nerve cell and recovery of non-adsorbed virus particles for at least five times, culturing the non-adsorbed virus on growing tissue to reestablish its population, contacting the Newcastle disease virus from said culture with normal chick embryo nerve cells again, separating the aqueous suspension containing the non-adsorbed Newcastle disease virus from the chick embryo nerve cells and repeating the process of adsorption and separation until the aqueous suspension contains a virulent Newcastle disease virus effective in immunizing chickens against infection by virulent Newcastle disease virus.

References Cited in the file of this patent

Bernkopf: PSEBM, 1940, pages 332–335.
Reagan et al.: PSEBM, December 1954, page 581.
Platt: Dissertation Abstracts, vol. 16, 1956, pages 9–10.
Hanson et al.: Virology, July 1959, pages 383–385.